(12) United States Patent
Selle (10) Patent No.: US 7,674,081 B2
(45) Date of Patent: Mar. 9, 2010

(54) HOPPER FED TEE-NUT HAVING COUNTERBORE WITH NYLON LOCK

(75) Inventor: Stephen Selle, Mentor, OH (US)

(73) Assignee: Stafast Products, Inc., Painesville, OH (US)

( * ) Notice: Subject to any disclaimer, the term of this patent is extended or adjusted under 35 U.S.C. 154(b) by 444 days.

(21) Appl. No.: 11/523,446

(22) Filed: Sep. 19, 2006

(65) Prior Publication Data
US 2008/0069660 A1 Mar. 20, 2008

(51) Int. Cl.
*F16B 37/04* (2006.01)
*F16B 39/34* (2006.01)

(52) U.S. Cl. .......................... 411/179; 411/303; 470/20

(58) Field of Classification Search ............... 411/302, 411/303, 246, 247, 179, 187, 427, 947, 177, 411/184
See application file for complete search history.

(56) References Cited

U.S. PATENT DOCUMENTS

| | | | |
|---|---|---|---|
| 180,064 A | 7/1876 | Rebasz | |
| 244,379 A | 7/1881 | Coulter et al. | |
| 397,988 A | 2/1889 | Kimball | |
| 797,545 A | 8/1905 | Reed | |
| 812,294 A | 2/1906 | Ette | |
| 1,773,146 A | 8/1930 | Kellogg | |
| 1,881,836 A | 10/1932 | Mitchell | |
| 1,893,067 A | 1/1933 | Arenz | |
| 1,919,728 A | 7/1933 | Kellogg | |
| 2,049,104 A | 7/1936 | Charlton | |
| 2,208,779 A | 7/1940 | Tinnerman | |
| 2,267,379 A | 12/1941 | Tinnerman | |
| 2,314,756 A | 3/1943 | Bedford, Jr. | |
| 2,321,497 A | 6/1943 | Luce | |
| 2,343,947 A | 3/1944 | Auslander | |
| 2,381,936 A * | 8/1945 | Sargent, Jr. | .................. 411/247 |
| 2,383,141 A | 8/1945 | Maage | |

(Continued)

FOREIGN PATENT DOCUMENTS

JP 2000-257619 * 9/2000

OTHER PUBLICATIONS

U.S. Appl. No. 11/444,729, filed Jun. 1, 2006, Selle.

*Primary Examiner*—Flemming Saether
(74) *Attorney, Agent, or Firm*—Woodling, Krost and Rust (57) ABSTRACT

A tee-nut fastener which includes a nylon locking ring located distally from the entrance to a passageway ensures proper fastening upon coupling with a threaded stud. The tee-nut is used use in combination with a track for efficient delivery. The track comprises an upper guide spaced apart relatively farther than a lower guide. The process for making the tee nut uses a cold heading process. The tee-nut includes a flange having an upper portion and a lower portion. A shank extends perpendicularly from the upper portion and a head extends oppositely from the shank and perpendicularly from the lower portion. The flange includes at least two teeth extending in the direction of the shank and a passageway through the shank, flange and head. The passageway includes a bore countersunk at both ends thereof, a cavity, and threads therein. A locking ring resides in the cavity and is relatively thin compared to the length of the teeth to ensure that the tee-nut is not extricated from a substrate in which the prongs or teeth are embedded upon coupling with a threaded stud.

14 Claims, 7 Drawing Sheets

U.S. PATENT DOCUMENTS

| | | | |
|---|---|---|---|
| 2,477,430 A * | 7/1949 | Swanstrom | 411/302 |
| 2,685,721 A | 8/1954 | Eves | |
| 2,936,668 A | 5/1960 | Meyer | |
| 2,968,206 A | 1/1961 | Bunnosuke | |
| 3,004,784 A | 10/1961 | Selby | |
| 3,037,596 A | 6/1962 | Fordyce | |
| 3,050,097 A | 8/1962 | Cochran | |
| 3,146,656 A | 9/1964 | Richards | |
| 3,234,612 A | 2/1966 | Raymond | |
| 3,235,917 A | 2/1966 | Skubic | |
| 3,270,610 A * | 9/1966 | Knowlton | 411/427 |
| 3,289,724 A * | 12/1966 | Ernest | 411/303 |
| 3,319,509 A | 5/1967 | Constantino | |
| 3,353,580 A * | 11/1967 | Benjamin | 411/303 |
| 3,358,727 A | 12/1967 | Hughes | |
| 3,403,218 A | 9/1968 | Norden | |
| 3,505,636 A | 4/1970 | McDowell | |
| 3,646,982 A | 3/1972 | Cushman | |
| 3,704,507 A | 12/1972 | Grube | |
| 3,809,139 A | 5/1974 | Strain | |
| 3,845,860 A | 11/1974 | Ladouceur et al. | |
| 3,878,599 A | 4/1975 | Ladouceur et al. | |
| 3,920,059 A | 11/1975 | Grube | |
| 3,926,236 A | 12/1975 | Pouch et al. | |
| 3,962,828 A | 6/1976 | McAllister | |
| 3,967,412 A | 7/1976 | Governale | |
| 4,074,464 A | 2/1978 | McCay | |
| 4,172,523 A | 10/1979 | Weglage | |
| 4,279,341 A | 7/1981 | Pleickhardt | |
| 4,306,654 A | 12/1981 | Grube | |
| 4,352,258 A | 10/1982 | Bursk | |
| 4,376,334 A | 3/1983 | Miller | |
| 4,377,360 A | 3/1983 | Kennedy | |
| 4,379,537 A | 4/1983 | Perrault et al. | |
| 4,387,535 A | 6/1983 | Corbo | |
| 4,447,987 A | 5/1984 | Lesosky | |
| 4,476,653 A | 10/1984 | Speer | |
| 4,508,478 A | 4/1985 | Leistner | |
| 4,580,322 A | 4/1986 | Wright | |
| 4,595,325 A | 6/1986 | Moran | |
| 4,768,907 A | 9/1988 | Gauron | |
| 4,770,275 A | 9/1988 | Williams | |
| 4,790,701 A | 12/1988 | Baubles | |
| 4,860,513 A | 8/1989 | Whitman | |
| 4,903,831 A | 2/1990 | Francis | |
| 4,913,609 A | 4/1990 | Mauer | |
| 4,945,680 A | 8/1990 | Giguere | |
| 4,961,553 A | 10/1990 | Todd | |
| 4,971,499 A | 11/1990 | Ladouceur | |
| 4,991,365 A | 2/1991 | Jackson | |
| 5,010,690 A | 4/1991 | Geoffrey | |
| 5,078,537 A | 1/1992 | Nomura | |
| 5,096,350 A | 3/1992 | Peterson | |
| 5,108,238 A | 4/1992 | Ewing | |
| 5,114,014 A | 5/1992 | Ascalon et al. | |
| 5,136,814 A | 8/1992 | Headrick | |
| 5,138,814 A | 8/1992 | Giles et al. | |
| 5,152,582 A | 10/1992 | Magnuson | |
| 5,179,804 A | 1/1993 | Young | |
| 5,195,854 A | 3/1993 | Nagayama | |
| 5,199,836 A | 4/1993 | Gogarty | |
| 5,214,843 A | 6/1993 | Bromley et al. | |
| 5,230,181 A | 7/1993 | Geoffrey | |
| 5,238,344 A | 8/1993 | Nagayama | |
| 5,273,351 A | 12/1993 | Rubel | |
| 5,297,851 A | 3/1994 | Van Hekken | |
| 5,299,686 A | 4/1994 | Bromley et al. | |
| 5,314,427 A | 5/1994 | Goble et al. | |
| 5,327,645 A | 7/1994 | Bromley et al. | |
| 5,348,432 A | 9/1994 | Nagayama | |
| 5,388,940 A | 2/1995 | Herren | |
| 5,391,031 A | 2/1995 | Medal | |
| 5,426,894 A | 6/1995 | Headrick | |
| 5,429,466 A | 7/1995 | Nagayama | |
| 5,489,173 A | 2/1996 | Hofle | |
| 5,501,558 A | 3/1996 | Figge | |
| 5,503,596 A | 4/1996 | Nagayama | |
| 5,517,788 A | 5/1996 | McGough | |
| 5,524,391 A | 6/1996 | Joffe | |
| 5,588,266 A | 12/1996 | Headrick | |
| 5,611,173 A | 3/1997 | Headrick | |
| 5,618,144 A | 4/1997 | Leistner | |
| 5,624,217 A | 4/1997 | Hungerford | |
| 5,638,641 A | 6/1997 | Joffe et al. | |
| 5,722,131 A | 3/1998 | Leistner | |
| 5,762,190 A | 6/1998 | Leistner | |
| 5,823,729 A | 10/1998 | Nagayama | |
| 5,863,164 A | 1/1999 | Leistner | |
| 5,893,538 A | 4/1999 | Onishi et al. | |
| 5,904,461 A | 5/1999 | McKarge | |
| 5,918,738 A | 7/1999 | Leistner | |
| 5,993,320 A | 11/1999 | Selle | |
| 6,071,052 A * | 6/2000 | Kerr | 411/302 |
| 6,095,738 A | 8/2000 | Selle | |
| 6,109,849 A | 8/2000 | Nagayama | |
| 6,129,431 A | 10/2000 | Hansen, Jr. et al. | |
| 6,129,493 A | 10/2000 | Leistner | |
| 6,131,347 A | 10/2000 | Hornberger et al. | |
| 6,139,237 A | 10/2000 | Nagayama | |
| 6,174,117 B1 | 1/2001 | Kawatani et al. | |
| 6,183,181 B1 | 2/2001 | Leistner | |
| 6,185,870 B1 | 2/2001 | Mettler | |
| 6,203,231 B1 | 3/2001 | Salice | |
| 6,209,722 B1 | 4/2001 | Leistner | |
| 6,272,814 B1 | 8/2001 | Ikuta et al. | |
| 6,305,888 B1 | 10/2001 | Leistner | |
| 6,345,477 B1 | 2/2002 | Kepler et al. | |
| 6,349,907 B1 | 2/2002 | Hollington et al. | |
| 6,407,351 B1 | 6/2002 | Meyer | |
| 6,637,994 B2 | 10/2003 | Leistner | |
| 6,640,968 B2 | 11/2003 | Selle | |
| 6,701,570 B2 | 3/2004 | Henriott et al. | |
| 6,832,696 B2 | 12/2004 | Donner | |
| 7,021,221 B2 | 4/2006 | Del Frari | |
| 7,287,732 B2 | 10/2007 | Balistreri | |
| 7,427,180 B2 | 9/2008 | Ladoucer et al. | |
| 7,484,700 B2 | 2/2009 | Selle | |
| 2004/0234356 A1 | 11/2004 | Parker et al. | |
| 2005/0232724 A1 | 10/2005 | Selle | |
| 2008/0193254 A1 | 8/2008 | Selle | |

* cited by examiner

HOPPER FED TEE-NUT HAVING COUNTERBORE WITH NYLON LOCK

FIELD OF THE INVENTION

The invention is in the field of tee-nuts having locks or locking rings to secure a threaded screw or bolt therein.

BACKGROUND OF THE INVENTION

Figure 1:
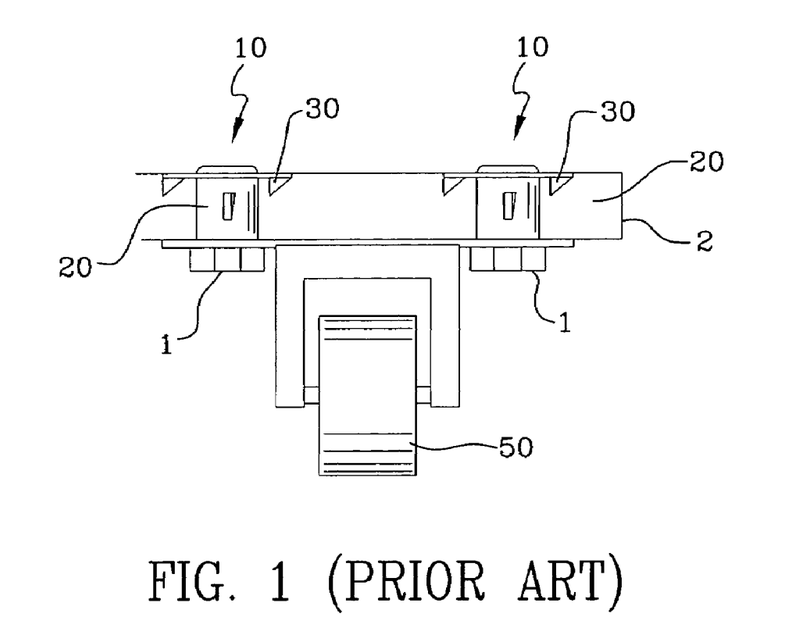
FIG. 1 is a front view of a prior art tee-nut illustrated in combination with a caster.
Figure 2:
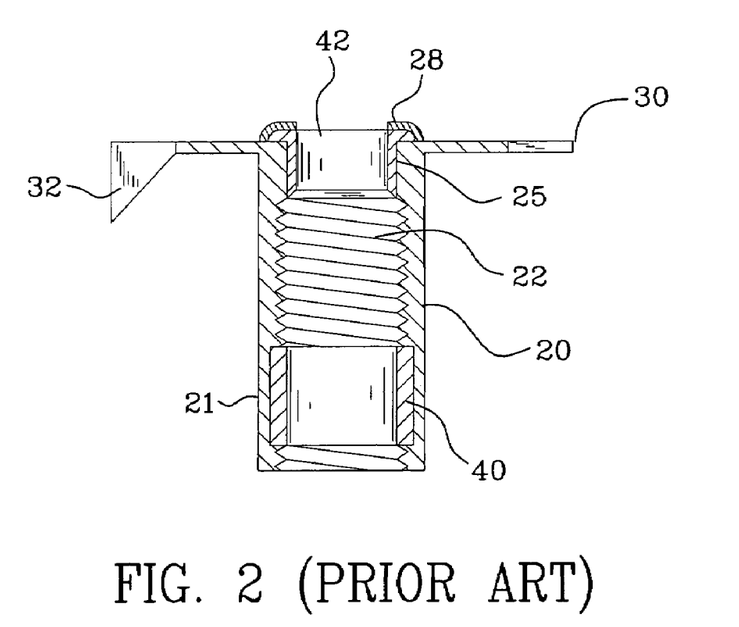
FIG. 2 is a cross-sectional view of the prior art tee-nut of FIG. 1.

U.S. Pat. No. 5,904,461 to McKarge, Jr. discloses a locking tee-nut (T-nut) 10 for securely fastening a threaded element such as a threaded bolt to a structure. FIG. 1 is a front view of a prior art tee-nut illustrated in combination with a caster 50. The tee-nuts 10 are used to secure the frame of the caster to the substrate. The device includes a cylindrical nut body 20 with a threaded bore 22 extending therethrough. The bore 22 has at least one resilient locking ring 40, 42 mounted within an annular groove 25 provided on the inner surface of the bore. A radial flange 30 extends radially from one end of the nut body and includes at least one securing tooth 32 extending therefrom toward the other end of the nut body. Reference numeral 21 denotes the outer surface of the body and reference numeral 28 is an annular lip. FIG. 2 is a cross-sectional view of the prior art tee-nut of FIG. 1.

The McKarge, Jr. tee-nut is not easily fed through a track delivery system due to the geometry of the teeth 32. It is, therefore, desirable to have a tee-nut which is reliably guided by a track and which includes the feature of a nylon locking ring for securing a stud which interengages the tee-nut.

Additionally, the tee-nut of McKarge has the disadvantage in that it may be dislodged from the substrate during assembly when a threaded member is inserted into the tee-nut because of the location of the resilient locking ring 40. In other words as the bolt 1 as illustrated in FIG. 1 is inserted into the tee-nut the teeth 32 may come loose by the force of the bolt pushing the locking ring 40 and the entire tee-nut out of the substrate 2. Additionally, the McKarge tee-nut has the disadvantage of short teeth or prongs 32 which are easily extracted from the substrate 2. In other words the teeth or prongs 32 are relatively short in relation to the locking ring 40. The other locking ring 42 does not solve the problem of pushing the tee-nut out of the substrate because the locking ring 40 is engaged by the bolt 1 before the bolt ever reaches the locking ring 42. Additionally, locking ring 42 also does not solve the problem even if locking ring 40 is not used because the teeth of McKarge are not long enough to prevent extraction of the tee-nut from the substrate. The locking ring 42 of McKarge is about the same length as the teeth 32 of McKarge.

The tee-nut of McKarge will require an external force to hold the tee-nut in engagement with the substrate.

These and other problems are solved by the instant invention as set forth hereinbelow.

SUMMARY OF THE INVENTION

A tee-nut for use in combination with a track is disclosed and claimed. The track comprises an upper guide and a lower guide. The upper guide is spaced apart relatively narrower than the lower guide.

The tee nut comprises a flange which includes an upper portion and a lower portion. The upper and lower portions of the tee nut slide within the guides. The tee nut includes a shank or barrel extending perpendicularly from the upper portion of the flange and a head extending perpendicularly from the lower portion of the flange. The flange includes four elongated teeth which extend perpendicularly from the flange and which are inserted deeply into a wooden substrate. A passageway extends through the barrel, flange and head. The passageway includes a stepped bore, a cavity, and female threads within the bore for interengagement with a stud. The passageway includes a first-counterbored entranceway for reception of a threaded stud. The first counterbore accommodates misalignment of the threaded stud with respect to the entranceway to the passageway so as to guide the threaded stud into the female threaded portion of the passageway. A locking ring resides in the cavity in the passageway.

The cavity is formed by a second counterbore at an end opposite the first counterbore and is enclosed by a lip which is deformed so as to assist in retaining a thin nylon locking ring in the bore or passageway of the tee-nut. The nylon locking ring is thin relative to the length of the four elongated teeth so as to ensure that the tee-nut will not be extricated from (pushed out of) the wooden substrate when a stud interengages the females threads of the passageway of the tee-nut. When a bolt or other threaded member is inserted into the first counterbore and is threaded into the female threaded portion of the passageway, it should be noted that the nylon locking ring is located relatively far from the entrance to the barrel shaped portion of the tee-nut. Thus, as the bolt is threaded into the tee-nut it interengages the nylon locking ring and tends to push the entire tee nut in the direction of travel of the bolt. However, since the nylon locking ring is not very thick or deep the prongs or teeth of the tee nut cannot escape (longitudinally, i.e., in the direction of travel of the bolt) from the substrate thus enabling the bolt to be completely threaded into the tee-nut resulting in a secure fastening device. It will be noticed that the nylon locking ring in the longitudinal or axial direction is not very thick compared to the length of the teeth of tee-nut. This means that the prongs or teeth remain embedded in the member or bolt to completely engage the nylon locking ring. To the extent a gap is created during coupling of a threaded member with the tee nut, the gap is closed and the tee-nut is drawn back into the substrate as the threaded member is screwed further into the tee nut.

The bore or passageway of the tee-nut extends completely through the tee-nut.

The head resides between the lower guide and the teeth reside between the upper guide and the tee nuts are thus guided by the track.

The stud interengages the locking ring which is preferably made of nylon. Since the nylon is relatively inelastic the stud cannot be loosened from the tee-nut as a result of vibration and similar forces and thus ensures a secure fastener.

A method of manufacturing a tee-nut is disclosed comprising the steps of: cold heading steel to form a flange having a solid barrel portion and a solid head portion; cold heading a bore through the solid barrel portion and the solid head portion; cold heading and forming a first counterbore in the bore of the barrel portion; cold heading and forming a second counterbore in the head portion for receiving a nylon locking ring; threading a portion of the bore; inserting the nylon locking ring into the second counter bore; crimping the nylon locking ring in place. The step of zinc plating may be added to the process. Additionally, the step of crimping the nylon locking ring may be performed by crimping the lip portion. The step of forming prongs or teeth may be added to the process as well.

Accordingly it is an object of the instant invention to provide a tee-nut which does not separate from the substrate in which it is lodged upon the entry of a threaded stud within the tee-nut.

It is a further object of the instant invention to provide a tee-nut which includes prongs or teeth which extend from a flange in combination with a nylon locking ring positioned such that the tee-nut will not be forcefully separated from a substrate in which it is embedded.

It is a further object of the instant invention to provide a hopper fed tee nut having a first counterbore and a nylon lock.

It is a further object of the present invention to provide a tee-nut having an enlarged head portion and a nylon lock within the enlarged head portion.

It is a further object of the present invention to provide a tee-nut having a nylon lock residing within a second counterbore located within the enlarged head.

It is a further object of the invention to provide a tee-nut having a head on one side of the flange with the head accommodating a nylon locking ring which is relatively thin.

It is a further object of the invention to provide a tee-nut having relatively long teeth or prongs extending from a flange and wherein the length of the teeth or prongs exceeds the axial length (thickness) of the nylon locking ring.

These and other objects will be best understood when reference is made to the Brief Description Of The Drawings and Description Of The Invention which follow hereinbelow.

BRIEF DESCRIPTION OF THE DRAWINGS

The drawings will be better understood when reference is made to the Description of the Invention and Claims which follow hereinbelow.

DESCRIPTION OF THE INVENTION

FIG. 1 is a front view of a prior art tee-nut 1 illustrated in combination with a caster and was described above in connection with the Background Of The Invention above. FIG. 2 is a cross-sectional view of the prior art tee nut of FIG. 1 with the Background Of The Invention above.

Figure 3:
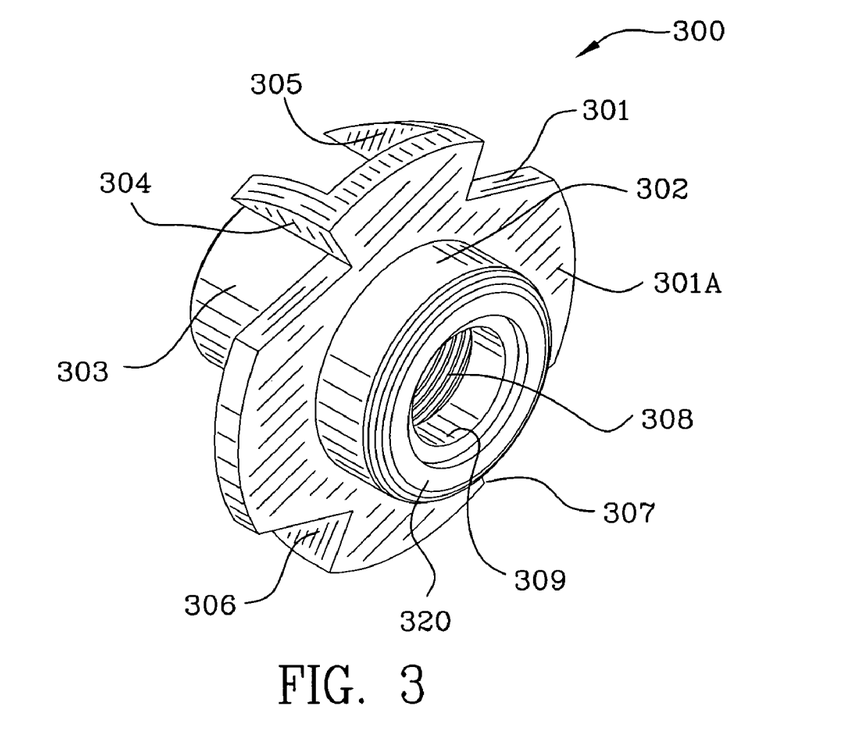
FIG. 3 is a bottom-side perspective view of the hopper fed tee-nut of the instant invention.

FIG. 3 is a bottom-side perspective view 300 of the hopper fed tee-nut of the instant invention. The hopper fed tee-nut includes head 320 which is used to guide the tee-nut in a feed track which leads from a hopper (not shown). Head 320 resides within a slot in the hopper feed. Locking ring 309 resides within a lip 320 to the head 302. Head 302 extends perpendicularly away from the bottom side 301A of flange 301. The tee-nut includes teeth 304, 305, 306, and 307 which extend perpendicularly in a direction opposite of the head 302. Teeth 304, 305, 306 and 307 are deformed and extend downwardly away from the flange 301. Reference numeral 301B is used to denote the top side of flange 301B and shank 303 extends perpendicularly away from the top side 301B of the flange 301.

Generally the material of construction of the tee nut is C1006 to C1010 carbon steel with a zinc plate finish. The locking ring 309 is preferably nylon but may be made of any suitable hard plastic capable of gripping exterior threads of a stud which non-elastically deform the suitable hard plastic.

Figure 3A:
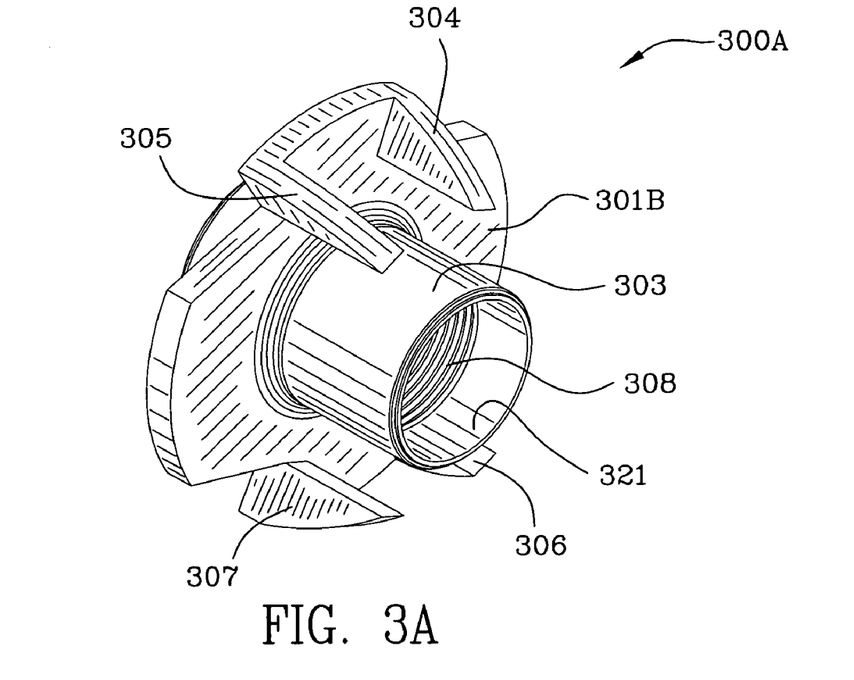
FIG. 3A is a top side (gripping side) perspective view of the hopper fed tee-nut of the instant invention.

FIG. 3A is a top side (gripping side) perspective view 300A of the hopper fed tee-nut of the instant invention. The tee-nut includes a passageway comprised of inner surfaces 309A, 308, 321 and 320. Surface 308 is a threaded surface which interengages corresponding threads 401A on stud 401. See, FIG. 4D which is a cross-sectional view 400D of the tee-nut interengaging a substrate made of wood 403 and coupled with a stud 401. Stud 401 secures two substrates such as those denoted by reference numerals 402 and 403 together. Reference numeral 309A is used to denote a cavity in which nylon locking ring 309 resides. However, the passageway through the tee nut includes the second entranceway 302 to the cavity 309A, the cavity 309A, the interior threaded portion 308 and the first counterbore or opening 321. The first counterbore 321 extends approximately 0.13 inches into the bore in the barrel portion of the tee-nut. The first counterbore enables alignment and coupling with a stud having exterior threads thereon.

Figure 4:
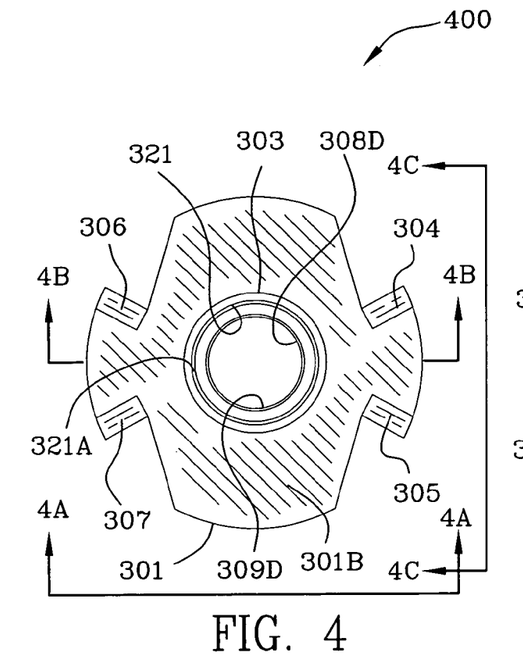
FIG. 4 is a top side view of the tee-nut.
Figure 4A:
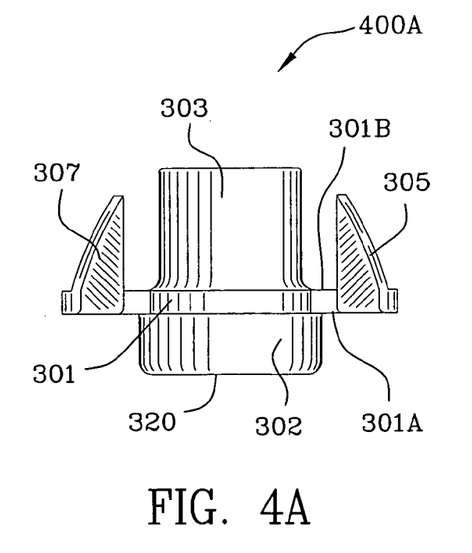
FIG. 4A is a side view of the tee-nut as viewed from the perspective of line 4A-4A of FIG. 4.
Figure 4B:
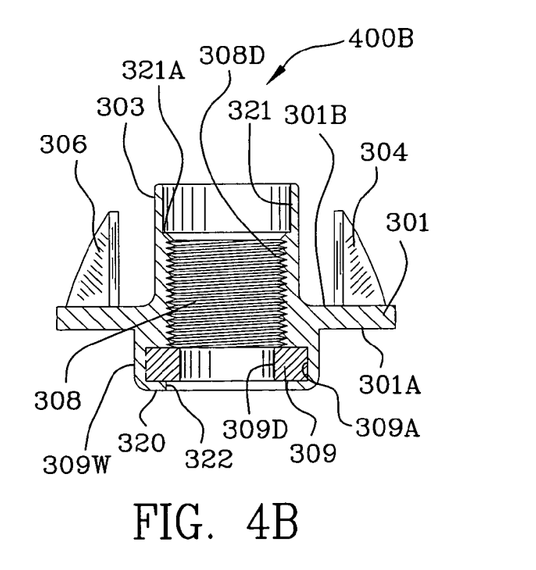
FIG. 4B is a cross-sectional view of the tee-nut taken along the line 4B-4B of FIG. 4.
Figure 4C:
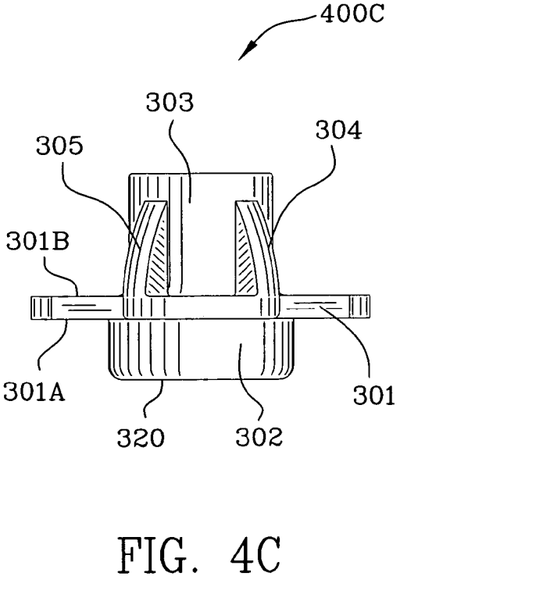
FIG. 4C is a side view of the tee-nut as viewed along the line 4C-4C of FIG. 4.
Figure 4D:
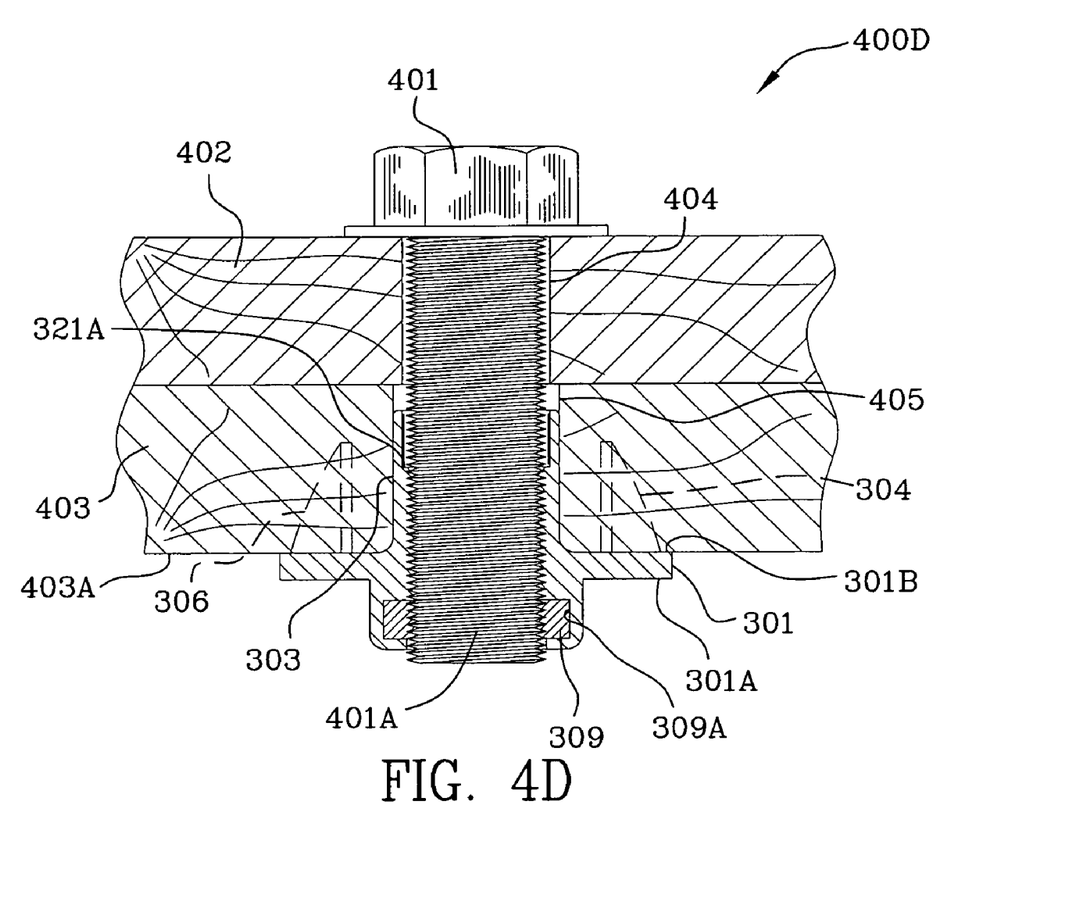
FIG. 4D is a cross-sectional view of the tee-nut and stud coupling two wooden substrates together.
Figure 4E:
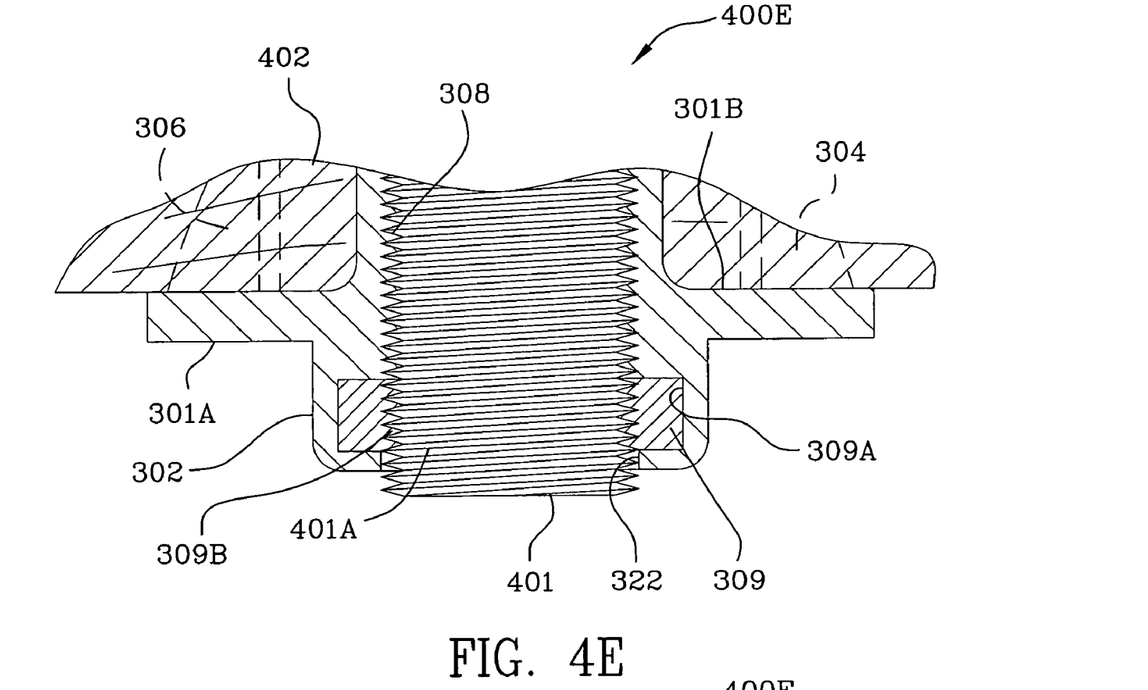
FIG. 4E is an enlargement of a portion of FIG. 4D illustrating the stud interengaging the nylon ring.

Locking ring 309 is a nylon or other hard polymer which interengages threads 401A of stud 401 as illustrated in FIGS. 4D and 4E. As threads 401A enter the locking ring 309 deformation 309B of the ring 309 occurs and threads 401A interengage the locking ring 309 and prevent the extraction of the stud 401 from the tee-nut. Locking ring 309 prevents the stud 401 illustrated in FIG. 4D from becoming loose so that the wood substrate pieces 402 and 403 remain joined together.

FIG. 4 is a top side view 400 of the tee-nut and illustrates the bore or passageway 321, 308 and the top of the flange 301B. Inner walls 309A and 322 are not visible in FIG. 4. FIG. 4A is a side view 400A of the tee nut viewed from the perspective of line 4A-4A of FIG. 4. Teeth or prongs 304, 305, 306, and 307 are bent upwardly from flange 301, are formed therefrom, and are of the same thickness as the flange 301. One such flange thickness which may be used is 0.06 inches; however, different flange thicknesses may be used depending on the application of the tee nut and the loads on the parts or substrates secured thereby.

FIG. 4B is a cross-sectional view 400B of the invention taken along the line 4B-4B of FIG. 4. FIG. 4B illustrates the inner surfaces 321, 308, 309A and 322 which form a passageway which receives a threaded stud 401 illustrated in FIG. 4D. FIG. 4C is a side view of the tee nut as viewed along the line 4C-4C of FIG. 4.

FIG. 4D is a cross-sectional view 400D of the tee nut interengaging the first substrate 403 which may be wood or plywood coupled to a second substrate 402 which also may be wood or plywood. A stud 401 is used which has threads 401A which interengage reciprocal threads 308 of the tee nut. As stud 401 is threaded into the reciprocal threads 308 of the tee nut threads 401A interengage and deform nylon ring 309. Reference numeral 309B is used to denote the deformation of nylon ring 309 by threads 401A. See, FIG. 4E.

Nylon ring 309 is trapped in a cavity 309A of the head portion 302 of the tee nut. Specifically, nylon ring 309 is trapped in a space defined generally by inner annular wall 309A and lip 322. The nylon ring 309 is non-elastically deformed when a threaded stud is forcibly engaged therewith. Reference numeral 309B represents the deformation of the nylon ring 309. As the stud is forcibly rotated into and through a portion of the nylon ring 309, a helical path matching the helical geometry of the stud is formed within the nylon ring. Referring to FIG. 4B, nylon ring 309 is annularly shaped with an inner diametrical surface 309D which extends radially inwardly. The nylon ring is essentially shaped like a washer.

Threaded portion 308 of the passageway includes an inner diameter 308D which represents the diameter of the threaded bore at the mean diametrical extent of the threads. Inner diametrical surface 309D (inner diameter surface 309D) of the locking ring 309 extends radially inwardly further than the inner diameter 308D of the threaded portion 308 which results in threads 401A interengaging the locking ring 309. See, FIG. 4F. Since the nylon ring 309 is retained within the head portion 302 of the tee nut, stud 401 does not loosen with respect to the threads 308 as the nylon ring 309 and the stud cannot move.

FIG. 4D is a cross-sectional view 400D of the tee nut interconnecting first substrate 403 and second substrate 402 together. The shank or barrel 303 of the tee nut is press fit into a corresponding bore 405 in the first substrate 403. In one example the shank or barrel of the tee-nut is approximately 0.33 inches long. Alternatively, barrel 303 of the tee-nut may snugly fit into bore 405 or the tee-nut may even be inserted with a gap between the barrel 303 and the bore 405. Teeth 304, 306 are pressed into the first substrate 403 until the top 301B of the flange 301 of the tee-nut is flush with respect to the surface 403A of the first substrate 403. It will be noticed that the teeth 304, 306 of the tee-nut are relatively long and are shown in phantom in FIG. 4D as substantially engaging substrate 403. In one example the teeth are approximately 0.25 inches long. Therefore, as the stud 401A enters the passageway it interengages threads 308 which are female interior threads of the tee-nut. As the stud progresses through and in engagement with threads 308 it engages nylon locking ring 309 where it is met with some resistance as nylon locking ring is not threaded. In one example the nylon locking ring is approximately 0.10 inches thick. In one example the overall length of the tee-nut is approximately 0.50 inches. The thickness of the nylon locking ring is relatively small in comparison to the length of the teeth so as to ensure that the teeth remain engaged with a wooden substrate in which the teeth of the tee-nut are embedded.

Referring to FIG. 4D, as bolt 401 interengages nylon ring 309 it tends to push the teeth 304, 306 (and the other teeth not shown in FIG. 4D) out of engagement with the wooden substrate 403. However, since the thickness of the nylon ring is relatively thin (small) as compared to the length of the teeth 304, 306, the threads 401A of the stud forcibly interengage the nylon ring 309 and inelastically deforms nylon ring 309 so as to secure the stud 401 to the nylon ring 309 and hence to the tee nut. While the threads 401A of the stud are interengaging the nylon ring 309 the top surface 301B of the flange of the tee-nut may separate slightly from the surface 403A of the wooden substrate creating a temporary gap. However, during this time the tee-nut will not rotate because the teeth are long enough to prohibit the rotation and the thickness of the nylon ring is approximately 0.10 inches. As the stud 401 is completely tightened the tee-nut and the teeth of the tee-nut are drawn completely back into the wooden substrate into the position indicated in FIG. 4D.

The passageway through the tee-nut includes a relatively larger diametrical region 321 than the mean diameter of the threaded region 308 to facilitate entry of the stud 401 into the threaded region. A bore 404 through the second substrate (wood/plywood) 402 permits passage of the stud 401 therethrough. An enlarged head portion (not numbered) of the stud engages the surface of the second substrate 402. In this way, the stud 401 engages the wooden substrate 402 securing it forcibly against the wooden substrate 403 such that there is no movement therebetween. Nylon locking ring 309 locks stud 401 with respect to the tee nut and stud 401 cannot be loosened with respect to threads 308.

The cavity 309 is formed by a second counterbore at an end opposite the first counterbore and is enclosed by a lip 320 which is deformed so as to assist in retaining the nylon locking ring in the bore or passageway of the tee-nut. When a bolt 401 or other threaded member is inserted into the first counterbore and is threaded into the female threaded portion 308 of the passageway, it should be noted that the nylon locking ring 309 is located relatively far from the entrance to the barrel shaped portion of the tee-nut. Thus, as the bolt 401 is threaded into the tee-nut it interengages the nylon locking ring and tends to push the entire tee nut in the direction of travel of the bolt. However, since the nylon locking ring is not very thick or deep the prongs or teeth of the tee nut cannot escape (longitudinally, i.e., in the direction of travel of the bolt) from the substrate 403 thus enabling the bolt to be completely threaded into the tee-nut resulting in a secure fastening device. It will be noticed that the nylon locking ring in the longitudinal or axial direction is not very thick compared to the length of the teeth of tee-nut. The bore or passageway of the tee-nut extends completely through the tee-nut.

FIG. 4E is an enlargement 400E of a portion of FIG. 4D illustrating the stud interengaging the nylon ring. Reference numeral 309B is used to indicate the non-elastic deformation of the nylon ring 309 so as to secure the stud 401 to the tee-nut.

Figure 4F:
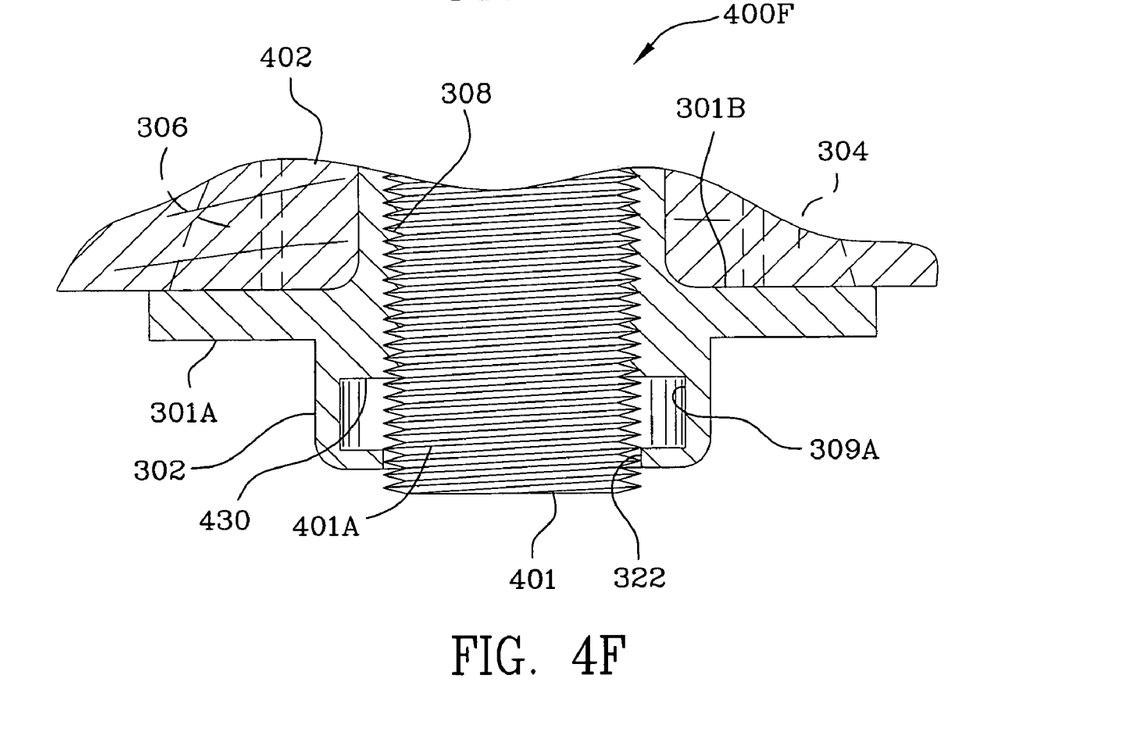
FIG. 4F is a view similar to FIG. 4E without the nylon locking ring in the counterbore.

FIG. 4F is a view 400F similar to FIG. 4E without the nylon locking ring 309 in the counterbore 309A. FIG. 4F illustrates the internal geometry of the cavity 309A which is formed by a second counterbore in the tee-nut. The second counterbore 430 is diametrically larger than the first counterbore in the tee-nut and is located within the head portion 302 of the tee-nut. A lip 322 is formed by mechanically bending the wall at the point of the second counterbore forming cavity 309A.

Figure 5:
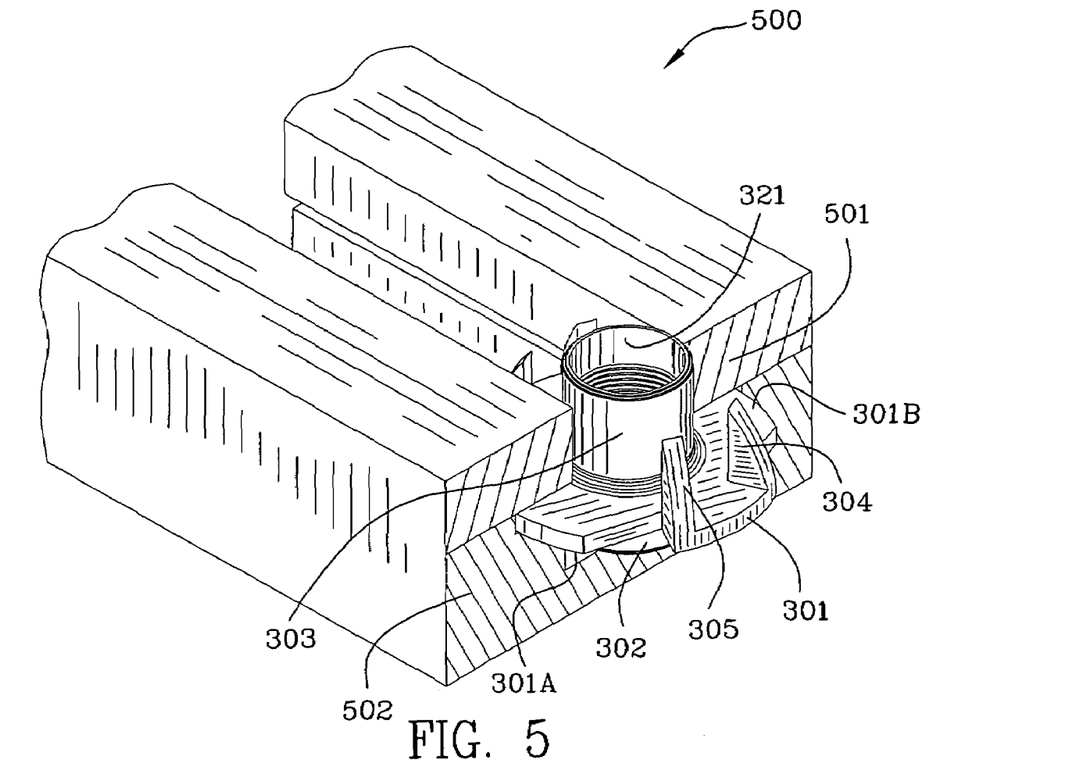
FIG. 5 is a perspective view of a tee-nut guided within a track.
Figure 5A:
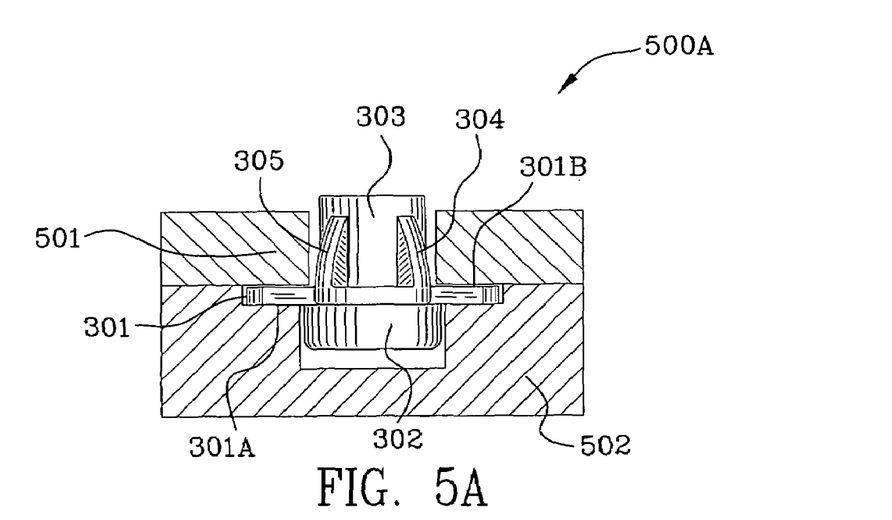
FIG. 5A is an end view of the tee-nut illustrated within the track.

The track comprises an upper guide 501 and a lower guide 502. The upper guide is spaced apart relatively narrower than the lower guide. The tee nut comprises a flange 301 which includes an upper portion and a lower portion. The upper and lower portions of the tee nut slide within the guides. The tee nut includes a shank or barrel 303 extending perpendicularly from the upper portion 301B of the flange and a head 302 extending perpendicularly from the lower portion 301A of the flange. The flange includes four teeth 304, 305, 306, 307 and a passageway 321, 308, 309A, 322, through the flange. The passageway includes a first counter bore 321 located within barrel 303, a stepped bore portion or shoulder 321A, a female threaded portion 308, a cavity or annular wall 309A, and an exit wall portion 322. The female threaded portion 308 within the bore interengages stud 401.

The passageway includes a first counterbored entranceway 321 for reception of threaded stud 401. The counterbore 321 accommodates misalignment of the threaded stud 401 with respect to the entranceway to the passageway so as to guide the threaded stud 401 into alignment with the female threaded portion 308 of the passageway. Shoulder 321A reduces the diameter of the bore to that represented by reference numeral 308D, the mean diameter of the threaded portion 308 of the bore through the tee nut. A locking ring 309 resides in the cavity 309A in the passageway. The cavity 309A is formed by a second counterbore 430 at an end opposite the first counterbore, i.e., at the head portion 302 of the tee-nut and is enclosed by a lip 320 which is deformed so as to retain the nylon locking ring 309 in the bore or passageway of the tee-nut. The bore or passageway of the tee-nut extends completely through the tee-nut. Lip 320 is created by mechanically deforming wall 309W.

FIG. 5 is a perspective view 500 of the barrel portion 303 of the tee-nut guided within track 501. FIG. 5A is an end view 500A of the tee-nut illustrated within the track. The track includes upper guide 501 and lower guide 502 portions for routing head portion 302 of the tee nut within the lower guide portion 502 and for routing teeth 304, 305, 306 and 307 through the upper guide portion 501 of the track. The upper guide portion of the track 501 is necessarily narrower as the spacing between the teeth 304, 305 and 306, 307 is narrower than the outside diameter of the head portion 302 of the tee-nut.

Figure 6:
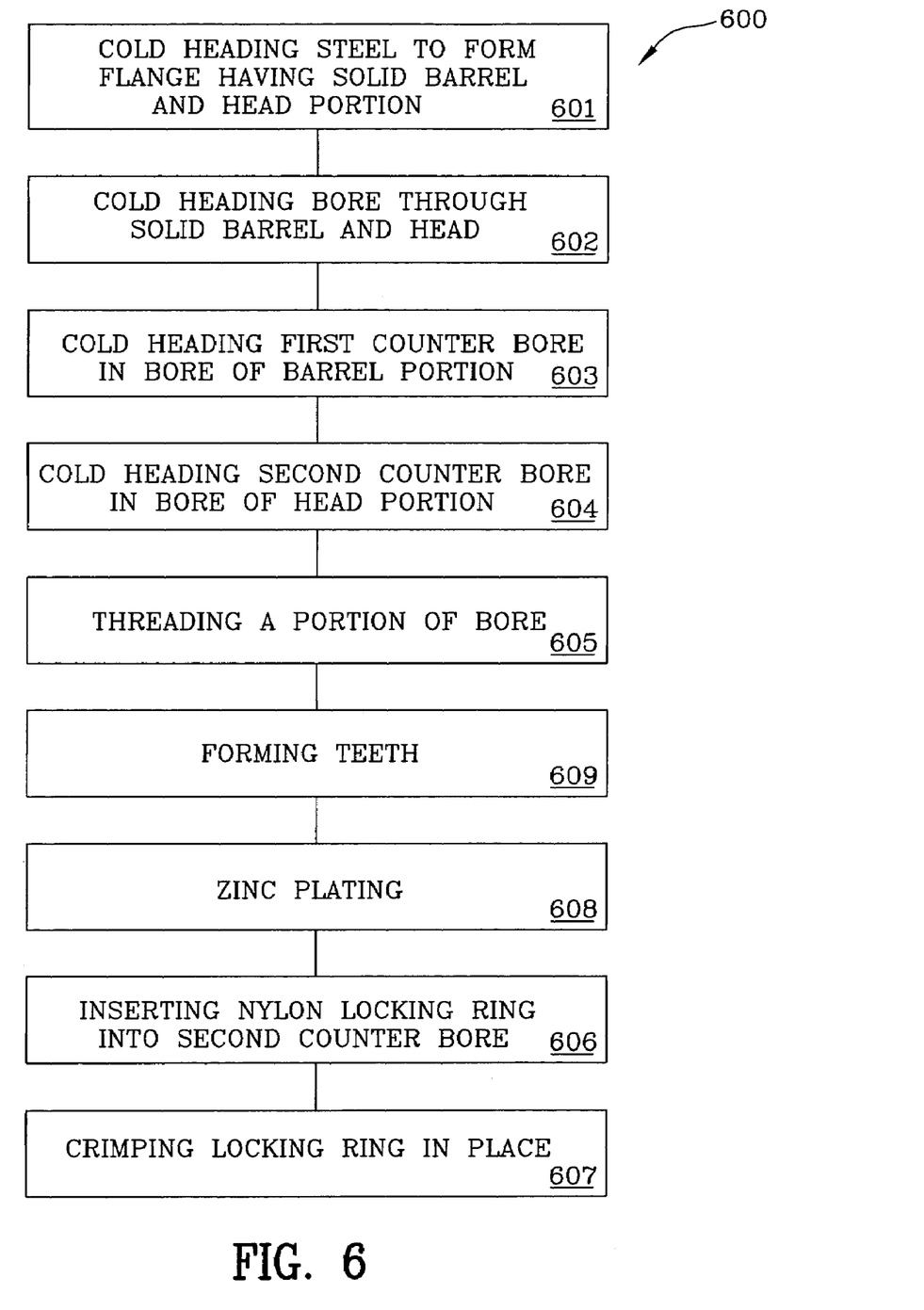
FIG. 6 is a schematic illustration of the process steps for manufacturing the tee-nut of the instant invention.

A process for making the tee-nut of the invention is disclosed. See, FIG. 6, a schematic illustration 600 of the process steps for manufacturing the tee-nut of the instant invention. The steps of the process include: cold heading steel to form a flange having a solid barrel portion and a solid head portion, 601; cold heading a bore through the solid barrel portion and the solid head portion, 602; cold heading and forming a first counterbore in the bore of the barrel portion, 603; cold heading and forming a second counterbore in the bore of the head portion for receiving a nylon locking ring, 604; threading a portion of the bore, 605; forming prongs or teeth, 609; zinc plating the tee-nut, 608; inserting the nylon locking ring into the second counter bore, 606; and, crimping the nylon locking ring in place 607. Additionally, the step of crimping the nylon locking ring may be performed by crimping the lip portion. The steps set forth herein may be performed in different sequences as desired.

The second counterbore forms a shoulder 430 in the bore through the tee-nut. Cavity 309A is bounded by the second counterbore and it is this second counterbore which interengages the locking ring 309 and secures it in place along with lip 320. The instant invention includes a passageway having a bore therethrough with the first counterbore terminating in shoulder 321A and the second counterbore terminating in shoulder 430. The counterbores 321A, 430 enable stud 401 to be inserted as indicated in FIG. 4D and to retain the locking ring 309.

A list of reference numerals follows.

LIST OF REFERENCE NUMERALS

1—threaded element
2—structure such as a plate
10—tee-nut
20—nut body
21—outer surface of the nut body
22—bore
25—annular groove
28—annular lip
30—radial flange
32—securing teeth
40—locking ring
42—locking ring
50—caster
301—flange
301A—bottom side of flange
301B—top side of flange
302—head of tee-nut
303—shank
304—tooth
305—tooth
306—tooth
307—tooth
308—threaded surface of passageway
308D—thread diameter
309—nylon locking ring
309A—inner surface of passageway
309B—non-elastic deformation of the locking ring caused by the threads of the stud
309D—diameter of the inner surface of the locking ring 309
309W—wall thickness of the second counterbore
320—lip or opening
321—first counterbore, opening of passageway
321A—shoulder in bore
322—wall of passageway trapping ring 309
401—stud
401A—threads on stud 401
402—second substrate
403—first substrate
403A—surface of first substrate 403
404—bore in second substrate 402
405—bore in first substrate 403
430—second counterbore
501—upper portion of track
502—lower portion of track
601—cold heading steel to form a flange having a solid barrel portion and a solid head portion
602—cold heading a bore through the solid barrel portion and the solid head portion
603—cold heading and forming a first counterbore in the bore of the barrel portion
604—cold heading and forming a second counterbore in the head portion for receiving a nylon locking ring
605—threading a portion of the bore
606—inserting the nylon locking ring into the second counter bore
607—crimping the nylon locking ring in place
608—plating the tee-nut with zinc or other material
609—crimping the nylon locking ring may be performed by crimping the lip portion
610—pressing or forming teeth or prongs.

The dimensions given in the specification are by way of example only and may be changed without departing from the spirit and scope of the claims which follow hereinbelow. Those skilled in the art will readily recognize that the invention has been set forth by way of example only and that changes may be made to the invention which has been set forth herein with particularity without departing from the spirit and scope of the invention as set forth in the claims below. For instance, changes to the length of the teeth or prongs may be made. Additionally, changes to the thickness or the axial length of the nylon locking ring can be made without departing from the spirit and the scope of the invention as set forth in the claims below.

The invention claimed is:

1. A tee-nut comprising: a flange; said flange includes at least one tooth; a barrel portion extending perpendicularly to said flange and a head portion extending perpendicularly from said flange in a direction opposite to said barrel portion, said tooth extending from said flange in the direction of said barrel portion; a passageway through said barrel, said flange and said head portion; said passageway includes a stepped bore, an annular cavity and threads therein, said threads in said passageway residing in said barrel, said flange and said head portion; said head portion includes a locking ring and said locking ring resides in said annular cavity in said passageway.

2. A tee-nut as claimed in claim 1 wherein said locking ring is a nylon locking ring.

3. A tee-nut as claimed in claim 2 wherein said passageway further includes a lip portion which in combination with said cavity comprises said head portion for housing said locking ring.

4. A tee-nut as claimed in claim 1 wherein said locking ring is located distally relative to said barrel portion of said flange.

5. A tee-nut as claimed in claim 1 wherein said at least one tooth extends perpendicularly from said flange in the same direction as said barrel portion and said at least one tooth is substantially longer than said locking ring.

6. A tee-nut comprising: a flange; said flange includes an upper portion and a lower portion; a shank extending perpendicularly from said upper portion of said flange and a head extending perpendicularly from said lower portion of said flange; said flange includes at least one tooth, said tooth extending from said flange in the direction of said shank; a passageway through said shank said flange and said head; said passageway includes a stepped bore, an annular cavity, and threads therein, said threads in said passageway residing in said shank, said flange and said head portion; a locking ring; and, said locking ring residing in said annular cavity in said head.

7. A tee-nut as claimed in claim 6 wherein said locking ring is a nylon locking ring.

8. A tee-nut as claimed in claim 6 wherein said passageway further includes a lip portion which in combination with said cavity comprises said head portion for housing said locking ring.

9. A tee-nut in combination with a substrate and a threaded member, said tee-nut interengages a substrate and receives said threaded member, comprising; a flange; said flange includes a barrel portion extending perpendicularly from said flange; said flange further includes a head portion extending from said flange in a direction opposite from said barrel portion; a bore extending through said barrel portion, said flange and said head portion; said bore includes a threaded portion, said threads in said bore residing in said barrel, said flange and said head portion; said flange includes at least one elongated tooth extending perpendicularly from said flange in the direction of said barrel; a first counterbore in said bore residing in said barrel portion of said bore and a second counterbore in said bore residing in said head portion of said bore; a locking ring; said locking ring residing in said second counterbore in said bore; said threaded member interengages said locking ring; said locking ring having a length, said at least one elongated tooth having a length, said length of said locking ring being less than said length of said elongated tooth such that said at least one tooth extending from said flange remains engaged with said substrate preventing rotation of said tee-nut when said threaded member interengages said locking ring and said threaded portion of said bore.

10. A tee-nut in combination with a substrate and a threaded member, said tee-nut interengages said substrate and receives said threaded member as claimed in claim 9 wherein said locking ring is a nylon locking ring and said head portion includes a deformed lip portion for securing said nylon locking ring within said head portion.

11. A tee-nut in combination with a substrate and a threaded member, said tee-nut interengages said substrate and receives said threaded member, comprising: a flange; said flange includes a barrel portion extending perpendicularly from said flange; said flange further includes a head portion extending from said flange in a direction opposite from said barrel portion; a bore extending through said barrel portion, said flange and said head portion; said bore includes a threaded portion, said threads in said bore residing in said barrel, said flange and said head portion; said flange includes at least one elongated tooth extending perpendicularly from said flange in the direction of said barrel; a first counterbore in said bore residing in said barrel portion of said bore and a second counterbore in said bore residing in said head portion of said bore; a locking ring; said locking ring residing in said second counterbore in said bore; said threaded member interengages said locking ring; said locking ring having a length, said at least one elongated tooth having a length, said length of said locking ring being less than said length of said elongated tooth such that said at least one tooth extending from said flange remains engaged with said substrate preventing rotation of said tee-nut when said threaded member interengages said locking ring and said threaded portion of said bore; said head portion includes a deformed lip portion for securing said locking ring within said head portion; and, said locking ring is approximately 0.10 inches or less thick and wherein said at least one tooth extends approximately 0.25 inches from said flange.

12. A tee-nut in combination with a track, said track comprising an upper guide and a lower guide, said upper guide being spaced apart relatively narrower than said lower guide, said tee nut comprising: a flange; said flange includes an upper portion and a lower portion; a shank extending perpendicularly from said upper portion of said flange and a head extending perpendicularly from said lower portion of said flange; said flange includes at least two teeth, said teeth extending from said flange in the direction of said shank; a passageway through said shank, said flange, and said head; said passageway includes a stepped bore, an annular cavity, and threads therein, said threads in said passageway residing in said shank, said flange and said head portion; a locking ring; said locking ring residing in said annular cavity in said head; and, wherein said head residing between said lower guide and said teeth residing between said upper guide.

13. A process for making a tee-nut, said tee-nut includes: a flange; said flange includes a barrel portion extending perpendicularly from said flange; said flange further includes a head portion extending from said flange in a direction opposite from said barrel portion; a bore extending through said barrel portion, said flange and said head portion; said bore includes a threaded portion, said threads in said bore residing in said barrel, said flange and said head portion; said flange includes at least one elongated tooth extending perpendicularly from said flange in the direction of said barrel; a first counterbore in said bore residing in said barrel portion of said bore and a second counterbore in said bore residing in said head portion of said bore; a locking ring; said locking ring residing in said second counterbore in said bore comprising the steps of: cold heading steel to form a flange having a solid barrel portion and a solid head portion; cold heading a bore through the solid barrel portion and the solid head portion; cold heading and forming a first counterbore in the bore of the barrel portion; cold heading and forming a second counterbore in the head portion for receiving a locking ring; threading a portion of the bore, said threads in said bore residing in said barrel, said flange and said head portion; forming prongs or teeth which emanate from said flange of said tee-nut; plating said tee-nut; inserting said locking ring into the second counter bore; and, crimping said locking ring in place.

14. A process for making a tee-nut as claimed in claim 13 further comprising the step of crimping a lip of said head portion to secure the nylon locking ring in place.

* * * * *